(12) United States Patent
Su et al.

(10) Patent No.: US 8,299,555 B2
(45) Date of Patent: Oct. 30, 2012

(54) SEMICONDUCTOR OPTOELECTRONIC STRUCTURE

(75) Inventors: Tzung-I Su, Yun-Lin County (TW);
Chao-An Su, Kaohsiung County (TW);
Ming-I Wang, Taipei County (TW);
Bang-Chiang Lan, Taipei (TW);
Tzung-Han Tan, Taipei (TW); Hui-Min Wu, Hsinchu County (TW); Chien-Hsin Huang, Taichung (TW); Min Chen, Taipei County (TW); Meng-Jia Lin, Changhua County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 160 days.

(21) Appl. No.: 12/618,774

(22) Filed: Nov. 15, 2009

(65) Prior Publication Data

US 2011/0115040 A1    May 19, 2011

(51) Int. Cl.
*H01L 31/0232* (2006.01)

(52) U.S. Cl. .............................. 257/432; 257/E31.127

(58) Field of Classification Search .................. 257/432, 257/E31.127
See application file for complete search history.

(56) References Cited

U.S. PATENT DOCUMENTS

| | | | |
|---|---|---|---|
| 7,041,956 B2 * | 5/2006 | Takahashi et al. | 250/208.1 |
| 7,079,727 B1 * | 7/2006 | Little | 385/28 |
| 7,373,048 B2 * | 5/2008 | Xia et al. | 385/43 |
| 7,544,992 B2 | 6/2009 | Shih | |
| 7,923,799 B2 * | 4/2011 | Lenchenkov | 257/432 |
| 2007/0072326 A1 | 3/2007 | Zheng | |
| 2008/0036020 A1 | 2/2008 | Ko | |
| 2009/0065820 A1 | 3/2009 | Kao | |

* cited by examiner

*Primary Examiner* — Howard Weiss
(74) *Attorney, Agent, or Firm* — Winston Hsu; Scott Margo

(57) ABSTRACT

A method of fabricating a semiconductor optoelectronic structure is provided. First, a substrate is provided, and a waveguide is formed therein, and then a plurality of dielectric layers is formed on the waveguide. Next, a contact pad and a passivation layer are provided on the dielectric layers and a patterned mask layer is formed thereon. Last, an etching process is provided by using the patterned mask layer to expose the contact pad and remove a portion of the passivation layer and the dielectric layers to form a transformer.

9 Claims, 6 Drawing Sheets

SEMICONDUCTOR OPTOELECTRONIC STRUCTURE

BACKGROUND OF THE INVENTION

1. Field of the Invention

The present invention relates to a method of fabricating a semiconductor optoelectronic structure, especially to a fabricating method that can integrate conventional semiconductor technology to form a semiconductor optoelectronic structure.

2. Description of the Prior Art

Along with the improvement of technology and the requirement of great data transmission in modern society, conventional copper cables are less capable of carrying more and more signals to travel a long distance due to the physical limitation of electrical resistance and signal delays. Naturally, optical fibers meet the demand of carrying very large information to travel a very long distance so they replace the conventional copper cables to be the medium of long distance carrier of information because one single optical fiber allows multiple beams of light of different wavelengths, each carrying different information to travel at the speed of light without mutual interference and without attenuating too much after traveling an extreme long distance. Substituting copper cables with optical fibers has been the main trend in the present years.

However, present semiconductor devices still use electrons to transmit signals. If we want to integrate optical signals into conventional integrated circuit (IC) structure, a well-designed optical transmission system is needed to serve as a converting system between the optical fiber transmission system and the copper cable transmission system. The optical transmission system usually includes a light waveguide, a light transformer, a light modulator, a photo-detector or other devices that are able to transmit, to separate, to combine optical signals, or to process electrical/optical switching. A light transformer can receive outside optical signals and, by its special material or three-dimensional shape, can couple the signals into the light waveguide. A light waveguide can transmit the optical signals in conventional semiconductor medium and by using different materials of different refractive index between the transmission medium and the coating medium, the light transmission integrity can be retained. Lastly, the optical signals are converted into a general electrical current message, accessing to electronic devices for the subsequent signal processing.

In current optical transmission system, the biggest problem lays in the depletion of optical signals resulting from the optical coupling effect between each optical device. For example, a conventional light transformer is usually formed in advance, and then each of the transformers is bonded onto the semiconductor substrate respectively. In detail, after forming the light waveguide, the already-formed light transformer is aligned and bonded onto the light waveguide by using an adhesive. However, the adhesive can easily contract when curing, and because of the different spreading effects due to different composition of the adhesive, the coupling effect between the light waveguide and the light transformer will decrease, affecting its transmission quality. In addition, the current trend of development optical transmission system is to integrate it into the existing semiconductor substrate, such as a semiconductor substrate including a CMOS disposed therein. Therefore, effectively integrating the optical components and semiconductor components by using existing semiconductor technologies to form an optoelectronic structure on the substrate remains a problem to be solved.

SUMMARY OF THE INVENTION

The present invention provides a method of fabricating a semiconductor optoelectronic structure, especially a fabricating method that can reduce the signal depletion and can be integrated into existing semiconductor technology.

According to the claimed invention, the present invention provides a method of fabricating a semiconductor optoelectronic structure. First, a substrate is provided, and a waveguide is formed therein, and then a plurality of dielectric layers is formed on the waveguide. Next, a contact pad and a passivation layer are provided on the dielectric layers and a patterned mask layer is formed thereon. Last, an etching process is provided by using the patterned mask layer to expose the contact pad and remove a portion of the passivation layer and the dielectric layers to form a transformer.

According to the claimed invention, the present invention further provides a semiconductor optoelectronic structure. The structure includes a substrate, a waveguide and a transformer. The waveguide is disposed on the substrate. The transformer is disposed on the waveguide. The transformer comprises a plurality of dielectric layers and partially overlaps with the waveguide.

The method can effectively integrate the semiconductor device manufacturing processes and the optical transmission device manufacturing processes, economizing the steps needed to fabricate optical devices and to connect them to the IC in conventional arts, so as to decrease the chip volume and increase the production efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
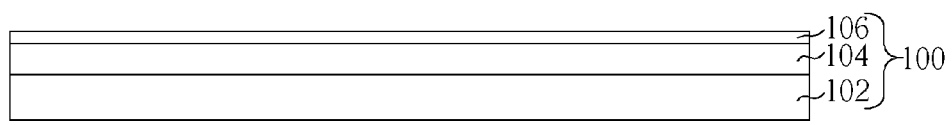
FIG. 1 to FIG. 11 illustrate the schematic diagrams of steps of the method to fabricate an optoelectronic structure in the present invention.

Please refer to FIG. 1 to FIG. 11, illustrating the schematic diagrams of steps of the method to fabricate an optoelectronic structure in the present invention. As shown in FIG. 1, a substrate 100 is provided. The substrate 100 can be a silicon substrate, an epitaxial silicon substrate, a silicon-germanium substrate, a silicon-carbonate substrate or a silicon-on-insulator (SOI) substrate. FIG. 1 shows an example of a SOI substrate, so the substrate 100 includes a silicon layer 102, an insulation layer 102 and a single crystal silicon layer 106.

Figure 2:
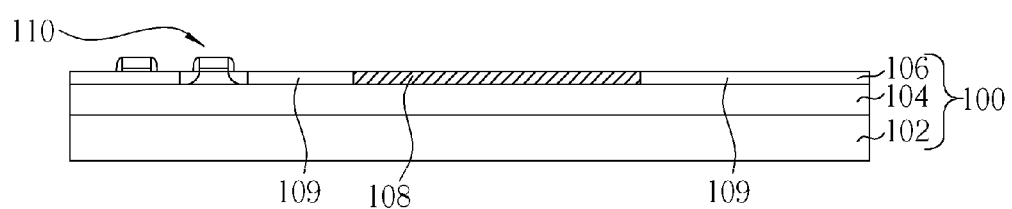

As shown in FIG. 2, a waveguide 108, a metal-oxide-semiconductor (MOS) 110 and a shallow trench isolation (STI) 109 are formed in the single crystal silicon layer 106. The waveguide 108 can be fabricated by using a photoresist having both a STI pattern and a waveguide pattern to process a conventional STI fabrication process. For example, a part of the single crystal silicon layer 106 is etched away to form a plurality of shallow trenches and at least a rib waveguide 108 and an active region are defined therefore. Then, a dielectric material is filled into the shallow trenches and a polish process is provided to form the STI 109. Subsequently, the MOS 110 is fabricated in the active region. The aforementioned steps are the standard semiconductor manufacturing process and detailed descriptions are omitted. Accordingly, the waveguide 108 is made of single crystal silicon which has greater refractive index than that of the dielectric material of the downside insulation layer 104 and the upside layer formed in the subsequent steps, leading to a total internal reflection when the light transmits to the border of the waveguide 108 and the insulation layer 104, preventing the light from refracting into the outside environment and maintaining the transmission quality.

Figure 3:
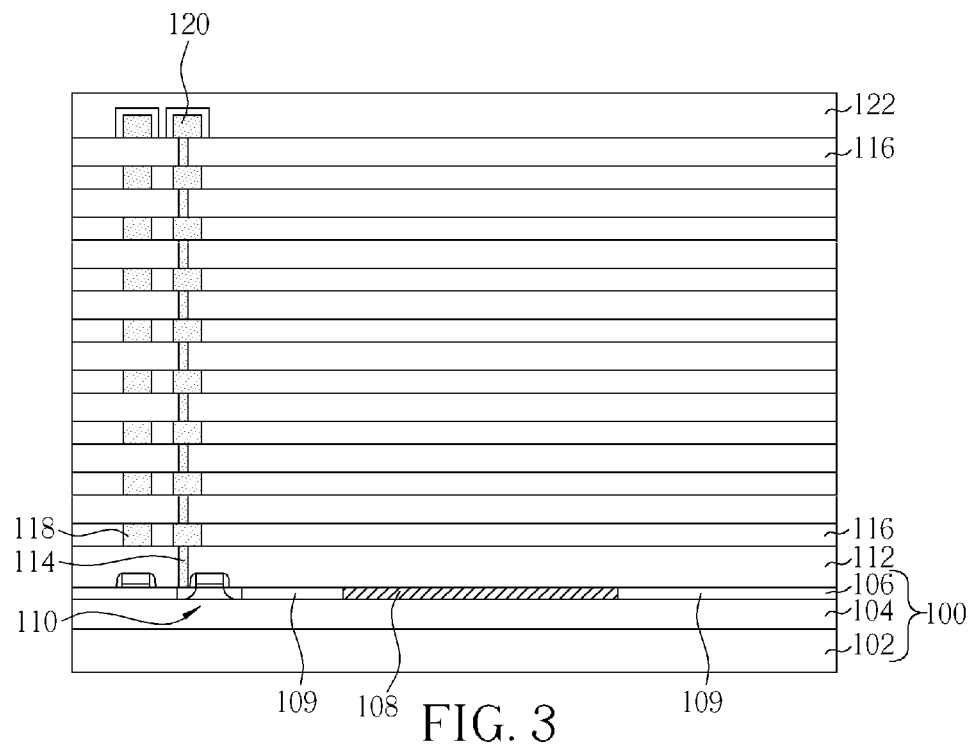

As shown in FIG. 3, an inter-dielectric (ILD) layer 112 is deposited on the waveguide 108 and the MOS 110 by a CVD process. The ILD layer 112 may be $SiO_2$, TEOS, PETEOS or other low-k dielectric materials which has a smaller refractive index than the waveguide 108. Then, a contact plug 114 is formed in the ILD layer 112 to electrically connect the MOS 110, for example, to electrically connect to the source region of the MOS no to form a driving electrical pathway.

Next, a metal interconnection manufacturing process is provided to form a plurality of dielectric layers and the needed metal interconnections on the ILD layer 112. For example, an inter-metal-dielectric (IMD) layer 116 is deposited. The material of the IMD layer 116 may be the same with the ILD layer 112 or may not be the same. Then a patterned metal layer 118 which electrically connects to the contact plug 114 is formed on the IMD layer 112. The material of the metal layer 118 includes copper, aluminum, tungsten or other suitable conductive materials and a metal damascene process can be used to form the metal layer 118. Then, the above steps are repeated to form an "IMD layer 116 and metal layer 118" stack structure wherein the numbers of the stack layers can be adjusted depending on the design of semiconductor products. FIG. 3 shows an example of an 8-layer stack structure.

After forming the plurality of IMD layers 116 and metal layers 118, at least one contact pad 120 is formed on the top of the IMD layers 116 and the contact pad 120 is electrically connected downwardly to the metal layers 118 to form a metal interconnection system. The material of the contact pad 120 includes aluminum or copper. A passivation layer 122 such as a silicon nitride layer is then formed on the contact pad 120.

Figure 4:
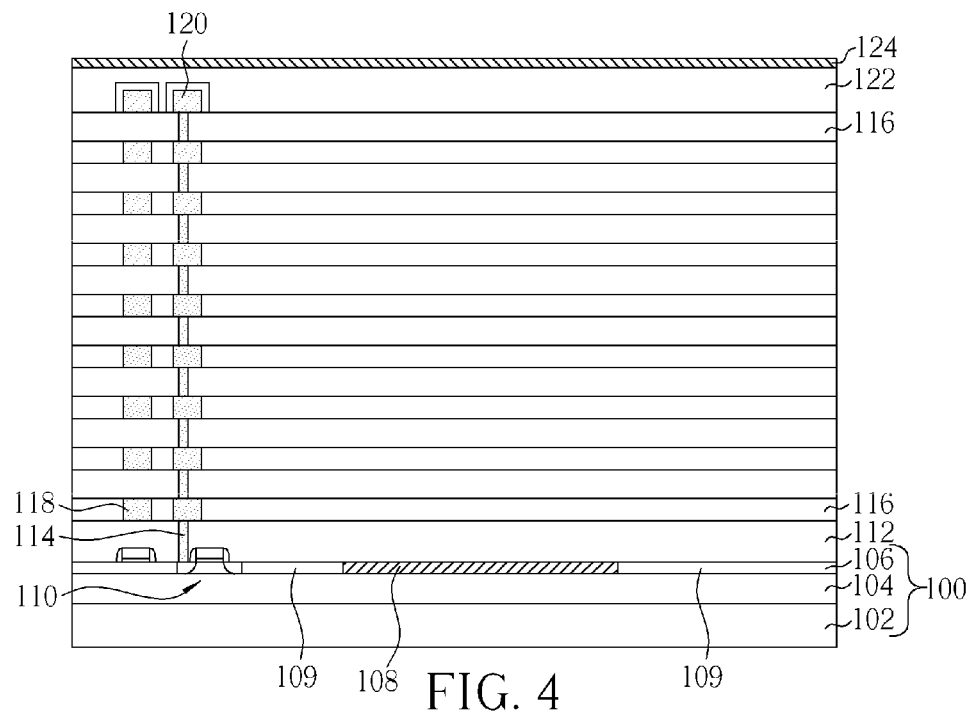
Figure 5:
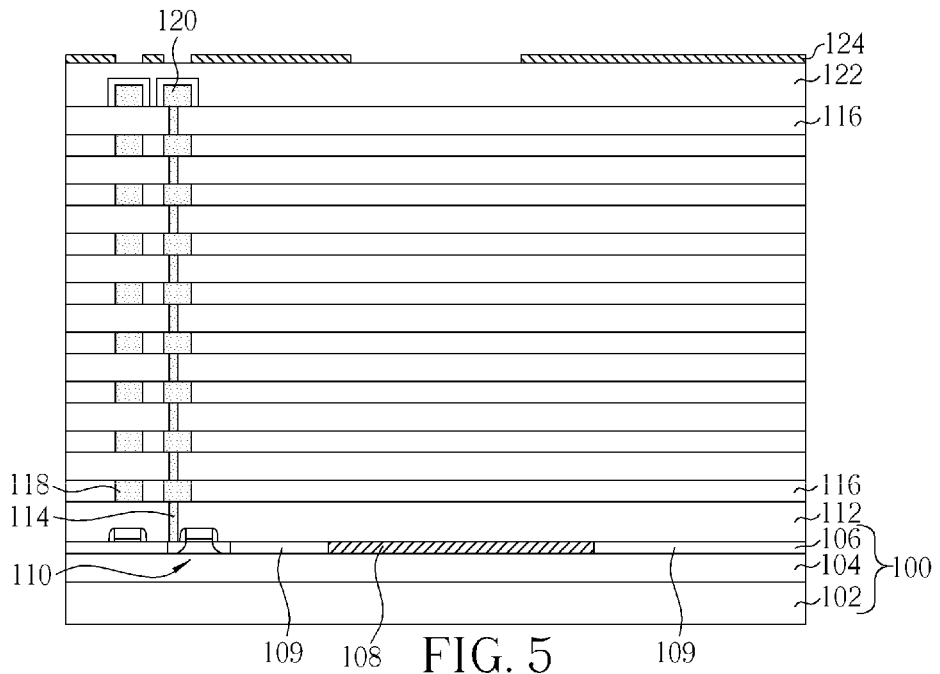
Figure 6:
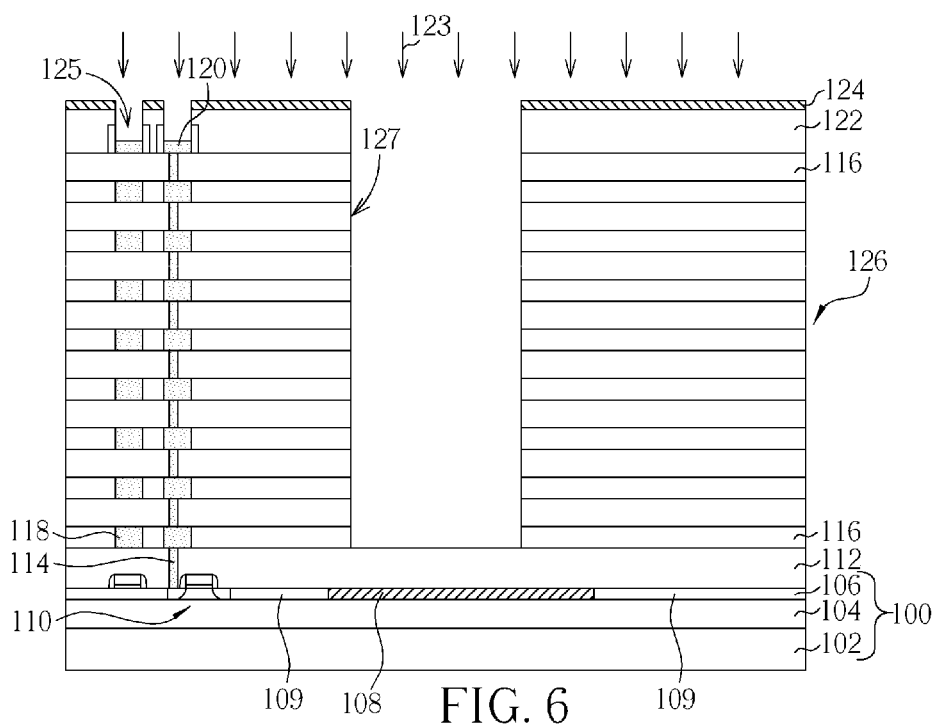

Please refer to FIG. 4. A mask layer 124 is formed on the passivation layer 122. A photo-etching-process (PEP) is then carried out to form the patterned hard mask 124 by using a patterned photoresist layer (not shown), as shown in FIG. 5. The patterned mask layer 124 corresponds to the contact pad 120 under the passivation layer 122 and the shape of the transformer formed in the IMD layers 116 in the subsequent steps. Please refer to FIG. 6. After removing the patterned photoresist layer (not shown), an etching process 123 is provided. As shown in the left part of FIG. 6, by using the patterned mask layer 124, a portion of the passivation layer 122 above the contact pad 120 is removed to form an opening 125 in the passivation layer 122, exposing the contact pad 120. Referring to the right part of FIG. 6, when processing the etching process 123, a portion of the passivation layer 122 and a portion of the IMD layers 116 are simultaneously removed to form a trench 127. The IMD layers 116 which are not removed and are encompassed by the trench 127 become a transformer 126.

Figure 7:
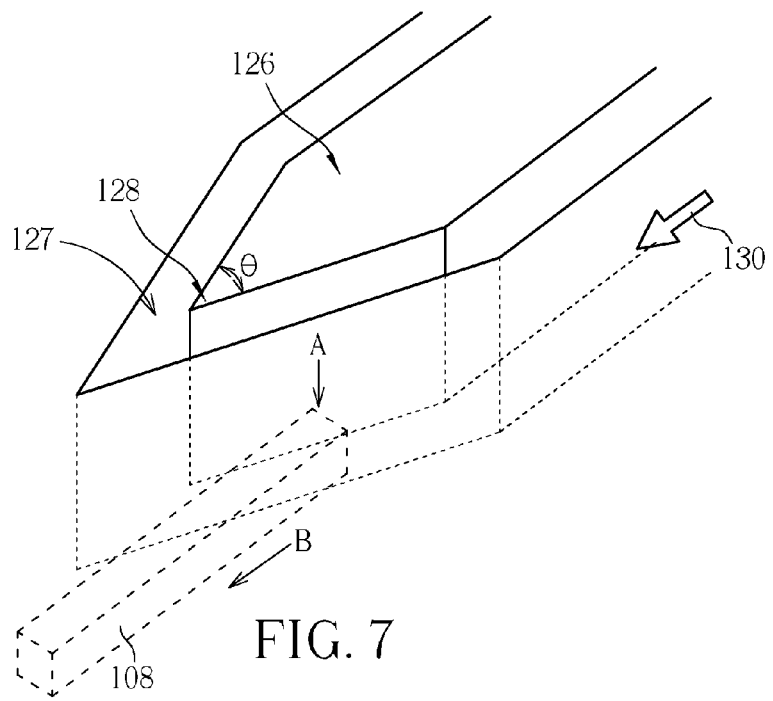
Figure 8:
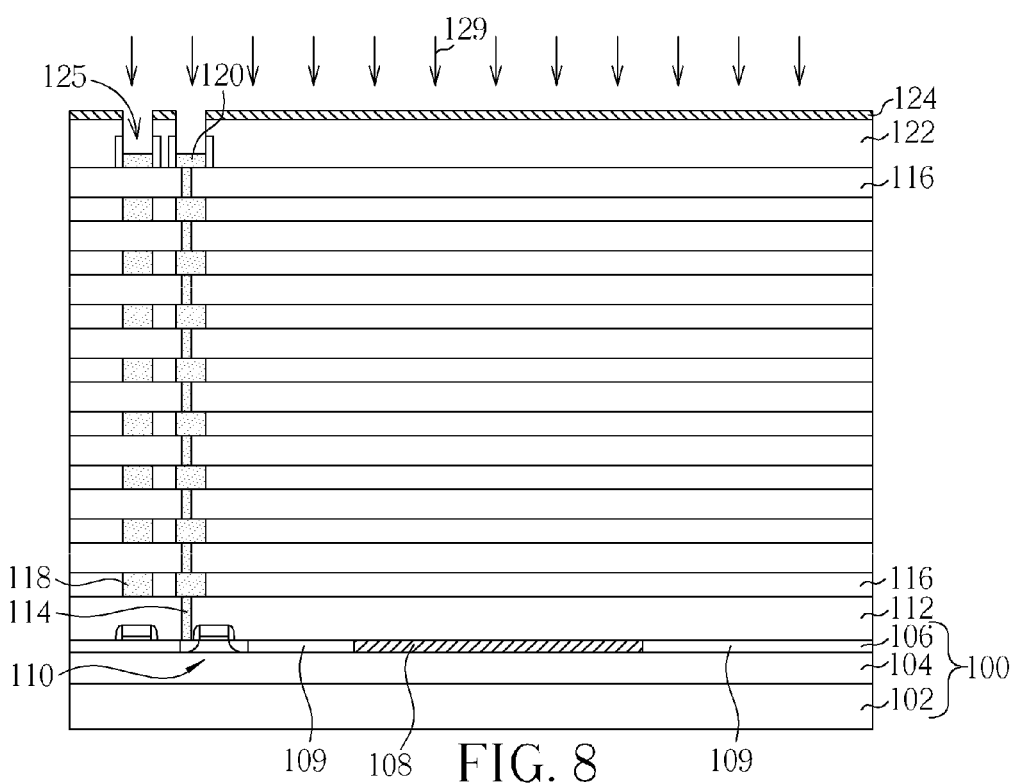

About the three-dimensional shape of the transformer 126, please refer to FIG. 7, illustrating a three-dimensional schematic diagram of the transformer in the present invention. As shown in FIG. 7, the etching process 123 removes a portion of the passivation layer 122 and a portion of the IMD layers 116 to form the trench 127. The transformer 126 is encompassed by the trench 127. Preferably, the transformer 126 includes a taper structure, which means the transformer 126 includes a tapered end 128 which is gradually narrower along one direction. The waveguide 108 is under the transformer 126 and partially overlaps the transformer 126 in the horizontal direction and the extension direction of the waveguide 108 and the tapered end 128 are approximately matched. Thus, when the light 130 travels in the transformer 126, a light coupling effect is carried out along the tapered end 128 and the light 130 is coupled downwardly in the direction of arrow A and then transmitted along the waveguide 108 in the direction of arrow B. To increase the coupling effect, the tapered end 128 in the present invention includes at least two sidewalls and the angle θ of the tapered end 128 is as small as possible. In the preferred embodiment, θ is between 0 to 2 degrees.

Please again refer to FIG. 6. In the etching process 123, the ILD layer 112 can be the etch stop layer. That is, the etching process 123 removes all the IMD layers 116 and the passivation layer 122 above the ILD layer 112 in the trench 127, but does not remove the ILD layer 112. In addition, in another preferred embodiment of the present invention, a capping layer (not shown) such as a silicon nitride layer can also be formed between the ILD layer 112 and the IMD layer 116. The capping layer can be used as an etch stop layer to make the etching process 123 stop in the capping layer and not remove the ILD layer 112 or the waveguide 108 disposed below.

Figure 9:
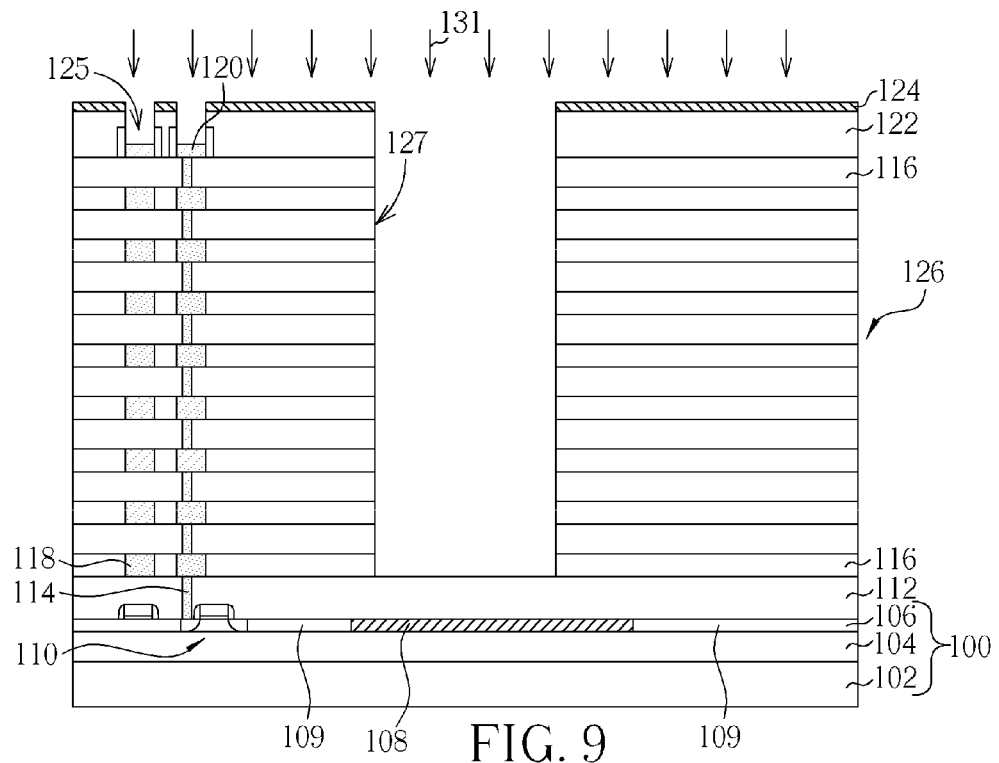

In another embodiment of the present invention, forming the transformer 126 and exposing the contact pad 120 can be provided in separated steps. For example, after forming the mask layer 124 as shown in FIG. 4, please refer to FIG. 8, a patterned mask layer 124 is formed. The patterned mask layer 124 corresponds to the contact pad 120 under the passivation layer 122. Then a first etching step 129 is provided to remove portions of the passivation layer 122 to form an opening 125, thereby exposing the contact pad 120. Subsequently, as shown in FIG. 9, another patterned photoresist (not shown) is provided to form another patterned mask layer 124 which corresponds to the contact pad 120 and the shape of the transformer 126 as well. Then, a second etching process 131 is provided. By using the patterned mask layer 124, a portion of the IMD layers 116 are removed to form a transformer 126. It is understood that the step of exposing the contact pad 120 and the step of forming the transformer 126 can be reversed. For example, form the transformer 126 first and then expose the contact pad 120.

Figure 10:
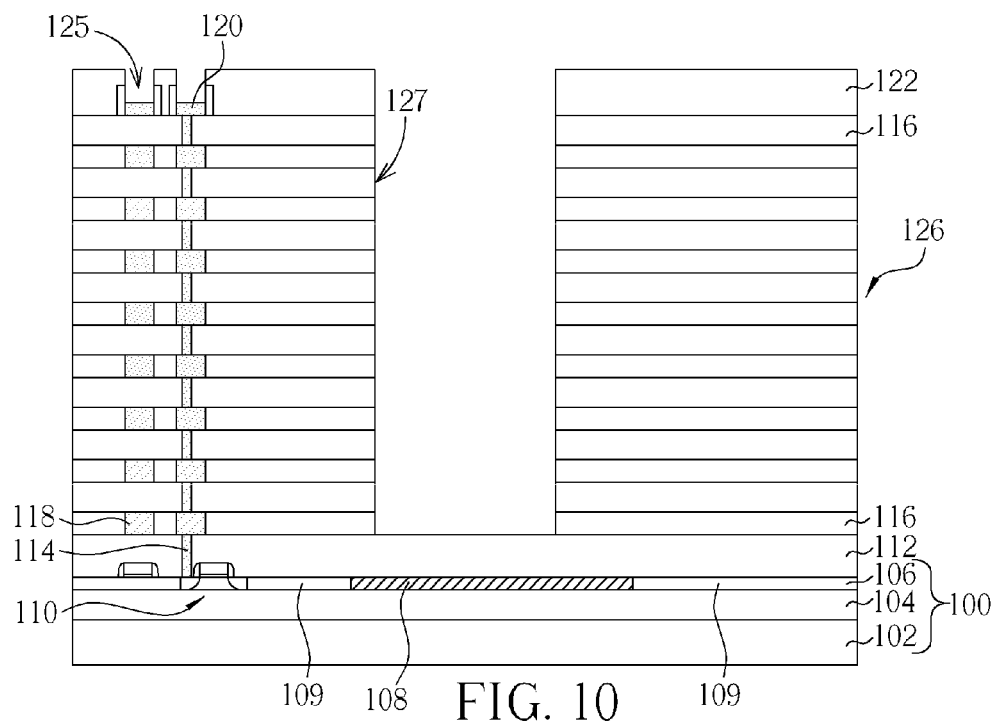

After forming the transformer 126 and exposing the contact pad 120, please refer to FIG. 10. The mask layer 124 is removed to complete the whole semiconductor optoelectronic structure. As shown in FIG. 10, because parts of the IMD layer 116 outside the transformer 126 have been removed in the etching process 123 to form the trench 127, the trench 127 is thus filled with air. Because the refractive index of air (approximately 1.00) is smaller than that of the IMD layer 116 of the transformer 126 (approximately 1.5 if it is $SiO_2$), when the light 130 travels in the transformer 126, the refraction phenomenon will not occur in the border of the transformer 126 and air, instead, the light 130 will totally inter reflect within the transformer 126.

Figure 11:
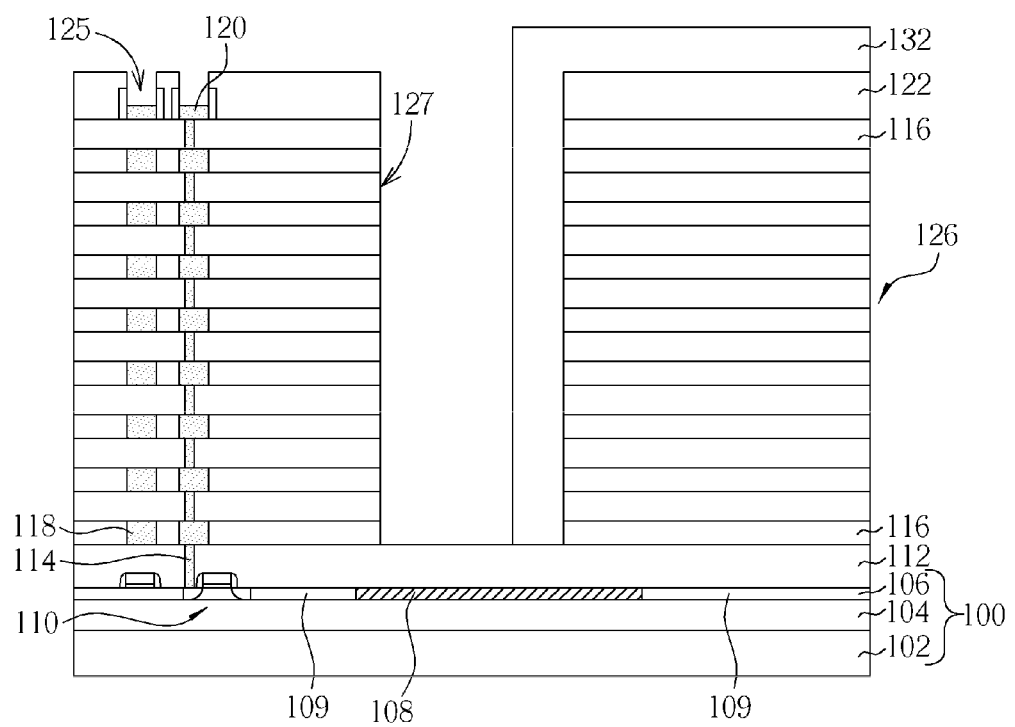

It is worthy to note that, to make sure the total inter reflection phenomenon can be kept, when the semiconductor optoelectronic structure is packaged in the subsequent steps by using a package material, it is needed to preserve air between the transformer 126 and the package material. For instance, to set up a supporting means to prevent the package material from filling into the trench 127. In another preferred embodiment, a covering layer 132 with a refractive index smaller than the transformer 126 can be formed on the transformer 126, as shown in FIG. 11, which can increase the total inter reflection phenomenon and protect the transformer 126 as well.

In another preferred embodiment, the MOS 110 can be other semiconductor devices, for example, a CMOS, a photo-detector, or a light modulator. The semiconductor device may include a light input side (not shown) which is able to receive the optical signal from the waveguide 108. For instance, if the semiconductor device is a photo-detector, the optical signal in the waveguide 108 can be converted to a current signal, thereby providing an efficient optical converting system.

Accordingly, by the abovementioned steps, the present invention provides a semiconductor optoelectronic structure. As shown in FIG. 11, the semiconductor optoelectronic structure includes a substrate 102, a waveguide 108, a transformer 126 and a passivation layer 122. The substrate 100 can be a silicon substrate, an epitaxial silicon substrate, a silicon-germanium substrate, a silicon-carbonate substrate or a silicon-on-insulator (SOI) substrate. The waveguide 108 is disposed on the substrate 102. The waveguide 108 usually includes single crystal silicon. The transformer 126 is disposed on the waveguide 108 and partially overlaps with the waveguide 108. The transformer 126 comprises a plurality of dielectric layers 116. The dielectric layers 116 comprise $SiO_2$, TEOS, PETEOS or other low-k dielectric materials which has a smaller refractive index than the waveguide 108. The passivation layer 122 is disposed on the transformer 126, such as a silicon nitride layer. In addition, the semiconductor optoelectronic structure can further comprise a covering layer 126 with a refractive index smaller than the transformer 126.

In light of above, a semiconductor optoelectronic structure and its fabricating method are provided in the present invention. The method can efficiently integrate the manufacturing processes of the semiconductor devices and the optical transmission system, saving many steps needed to form the transformer in conventional arts so as to increase the production efficiency and decrease the cost and volume of the chip. Moreover, the present invention further provides a covering layer to protect the transformer and maintain the light transmission and coupling effect.

Those skilled in the art will readily observe that numerous modifications and alterations of the device and method may be made while retaining the teachings of the invention.

What is claimed is:

1. A semiconductor optoelectronic structure, comprising:
   a substrate;
   a waveguide disposed on the substrate; and
   a transformer disposed on the waveguide, wherein the transformer comprises a plurality of dielectric layers, the dielectric layers having a trench therebetween, the trench comprising a plurality of side walls, and the side walls of the trench defined by the dielectric layers are vertically aligned, and the transformer partially overlaps with the waveguide.

2. The structure as in claim 1, wherein the transformer further comprises a passivation layer disposed on the dielectric layers.

3. The structure as in claim 1, further comprising a covering layer disposed on the surface of the transformer, wherein the refractive index of the covering layer is smaller than that of the dielectric layers.

4. The structure as in claim 3, wherein the covering layer maintains the light transmission and coupling effect.

5. The structure as in claim 1, further comprising a package material disposed on the transformer, wherein air remains between the package material and the transformer.

6. The structure as in claim 1, further comprising a semiconductor device on the substrate, wherein the semiconductor device comprises a light input side to receive an optical input signal from the waveguide.

7. The structure as in claim 6, wherein the semiconductor device comprises a CMOS, a photo-detector or a light modulator.

8. The structure as in claim 1, wherein the transformer comprises a tapered end, wherein the tapered end comprises at least two sidewalls and the angle of the tapered end is between 0 to 2 degrees.

9. The structure as in claim 8, wherein the tapered end of the transformer having the two sidewalls of the tapered end meet at one singular edge.

* * * * *